United States Patent [19]

Tieberghien et al.

[11] Patent Number: 5,388,529
[45] Date of Patent: Feb. 14, 1995

[54] RAIL VEHICLE BODY MADE OF STAINLESS STEEL

[75] Inventors: Philippe Tieberghien, Lys Lez Lannoy; Fernand Ramez, Artres; Max Lhommet, Raismes; Michel Berquet, Marly, all of France

[73] Assignee: GEC Alsthom Transport SA, Paris, France

[21] Appl. No.: 70,679

[22] Filed: Jun. 2, 1993

[30] Foreign Application Priority Data

Jun. 3, 1992 [FR] France .................. 92 06734

[51] Int. Cl.⁶ .............................................. B61D 17/00
[52] U.S. Cl. .................................. 105/397; 105/401; 105/418; 105/413
[58] Field of Search .............. 105/396, 397, 401, 400, 105/399, 398, 413, 418, 419; 296/187, 191, 193, 196, 197, 203, 204, 209

[56] References Cited

U.S. PATENT DOCUMENTS

| | | | |
|---|---|---|---|
| 2,314,979 | 3/1943 | Gunn | 105/401 |
| 2,620,750 | 12/1952 | Watter | 105/401 |
| 2,815,722 | 12/1957 | Dean | 105/401 |
| 2,870,723 | 1/1959 | Bock et al. | 105/401 |
| 3,347,175 | 10/1967 | Butcher | 105/401 |
| 3,461,819 | 8/1969 | Eggert | 105/401 |
| 3,672,309 | 6/1972 | Van Der Sluys et al. | 105/401 |
| 5,140,913 | 8/1992 | Takeichi et al. | 296/191 |
| 5,267,515 | 12/1993 | Tsuruda et al. | 296/187 |

FOREIGN PATENT DOCUMENTS

| | | | |
|---|---|---|---|
| 2031546 | 9/1971 | Germany . | |
| 0045258 | 2/1990 | Japan | 105/401 |
| 0157261 | 7/1991 | Japan | 105/397 |
| 0167067 | 7/1991 | Japan | 105/397 |
| 9118780 | 12/1991 | WIPO | 105/397 |

*Primary Examiner*—Mark T. Le
*Attorney, Agent, or Firm*—Sughrue, Mion, Zinn, Macpeak & Seas

[57] ABSTRACT

A rail vehicle body is made of stainless steel, wherein: the length members of the chassis and the roof battens are made of stainless steel, are constituted by section members that are continuous along the entire length of the body, and are visible; and the covering of the side faces comprises sheets of stainless steel that are smooth and thin relative to the thickness of said section members, the sheets being fixed by continuous leak-proof welding to the edges of the length members and to the roof battens so that the area of said metal sheets is as small as possible. The elements of the strength-providing structure are assembled together by weld fillets, and likewise the metal sheets are assembled to said strength-providing structure by weld fillets.

13 Claims, 6 Drawing Sheets

RAIL VEHICLE BODY MADE OF STAINLESS STEEL

The present invention relates to a rail vehicle body comprising elements made of stainless steel.

BACKGROUND OF THE INVENTION

Rail vehicle bodies are already known that are made of stainless steel and that are constituted by stainless steel sheets welded onto a strength-providing structure. Unpainted stainless steel has the property of being easy to clean, and this is a considerable advantage in the maintenance of suburban trains that are often subject to graffiti.

For reasons of appearance, and given the large amount of deformation that occurs due to heat, it is necessary to take certain precautions when welding very thin sheets of stainless steel on the strength-providing structure of the body. The sheet metal is then fixed to the strength-providing structure by the resistance spot welding method. The procedure is as follows. Pieces of sheet metal are placed against the strength-providing structure so as to overlie the length members of the chassis and the roof battens, and they are fastened to the structure by spot welds. Wherever sealing is required, an electroplastic sealant is interposed between the parts to be welded together.

The sheet metal is first heated and then strained by mechanical tension prior to being welded onto the strength providing structure.

Although resistance spot welding is satisfactory from the appearance point of view for an unpainted stainless steel vehicle, it is insufficient when applied to the strength-providing structures of the body (length members, roof battens, door uprights) with respect to guaranteeing integrity of the passenger volume in the event of a collision. In addition, market forces are leading to smooth-faced designs and ever tighter targets concerning mass savings, productivity, and ease of manufacture in order to enable the technology to be exported.

The above lead to the use of covering sheets on the smooth faces that are as thin as possible and to their being fixed to the structure by spots which are associated with weld fillets (requiring large amounts of energy) so as to cause the metal sheets to contribute to the strength of the body. Under such conditions, and with a rail vehicle of the known prior art type as described above, it is necessary to have recourse to operations for making the metal sheets plane (e.g. by beating that leave traces that are highly visible). Such operations are difficult given the appearance of unpainted metal sheets.

OBJECTS AND SUMMARY OF THE INVENTION

The invention makes it possible to solve this problem by using thick section members of stainless steel for the length members of the chassis, the roof battens, and the framework members of the side faces which are assembled together by welding with the addition of filler metal that ensures the structure is strong (e.g. MIG welding), with the side faces being covered by thin and smooth sheets of stainless steel that are of area that is as small as possible in order to limit the deformation of the sheets due to welding for sealing purposes.

This is possible if the thick section members are visible so as to constitute a non-negligible fraction of the visible metal surface area.

The invention thus provides a rail vehicle body made of stainless steel, wherein:

the length members of the chassis and the roof battens are made of stainless steel, are constituted by section members that are continuous along the entire length of the body, and are visible; and the covering of the side faces comprises sheets of stainless steel, that are smooth and thin relative to the thickness of said section members, the sheets being fixed by continuous leakproof welding to the edges of the length members and to the roof battens so that the area of said metal sheets is as small as possible.

Advantageously, the side faces are set back relative to the chassis length members and to the roof battens. This facilitates and limits the welding that takes place outside the forming radius of the section members.

Advantageously, the body has no covering sheet metal between the window bays and the length members or between the window bays and the roof battens. This makes it possible to minimize the area of covering sheets and to limit the leak-proofing welds.

Since the section members of the side face frameworks form assembly nodes, the section members can be stamped and cut out at the assembly nodes so that said section members form a common plane surface. This makes it possible to limit the milling that needs to be performed on the welds adjacent to the covering sheets and to eliminate machining for fitting the section members together, while avoiding assembly adjustments.

The section members constituting the length members, the roof battens, and the frameworks of the side faces and of the chassis are advantageously assembled together by weld fillets including filler metal. This type of weld provides a structure with greater strength in the event of a collision.

The covering sheets are secured by resistance spot welds (of low energy to minimize deformation), by discontinuous fillet welds with filler metal around the window bays and the door bays, and by continuous leak-proofing welds between the sheets and the length members, and between the sheets and the roof battens, thereby providing strong connections.

BRIEF DESCRIPTION OF THE DRAWINGS

The invention will be better understood and other advantages and features thereof will appear on reading the following description given by way of non-limiting example and made with reference to the accompanying drawings, in which.

MORE DETAILED DESCRIPTION

The description relates to a double-decker rail vehicle, but the invention is equally applicable to a single-decker vehicle.

Figure 1:
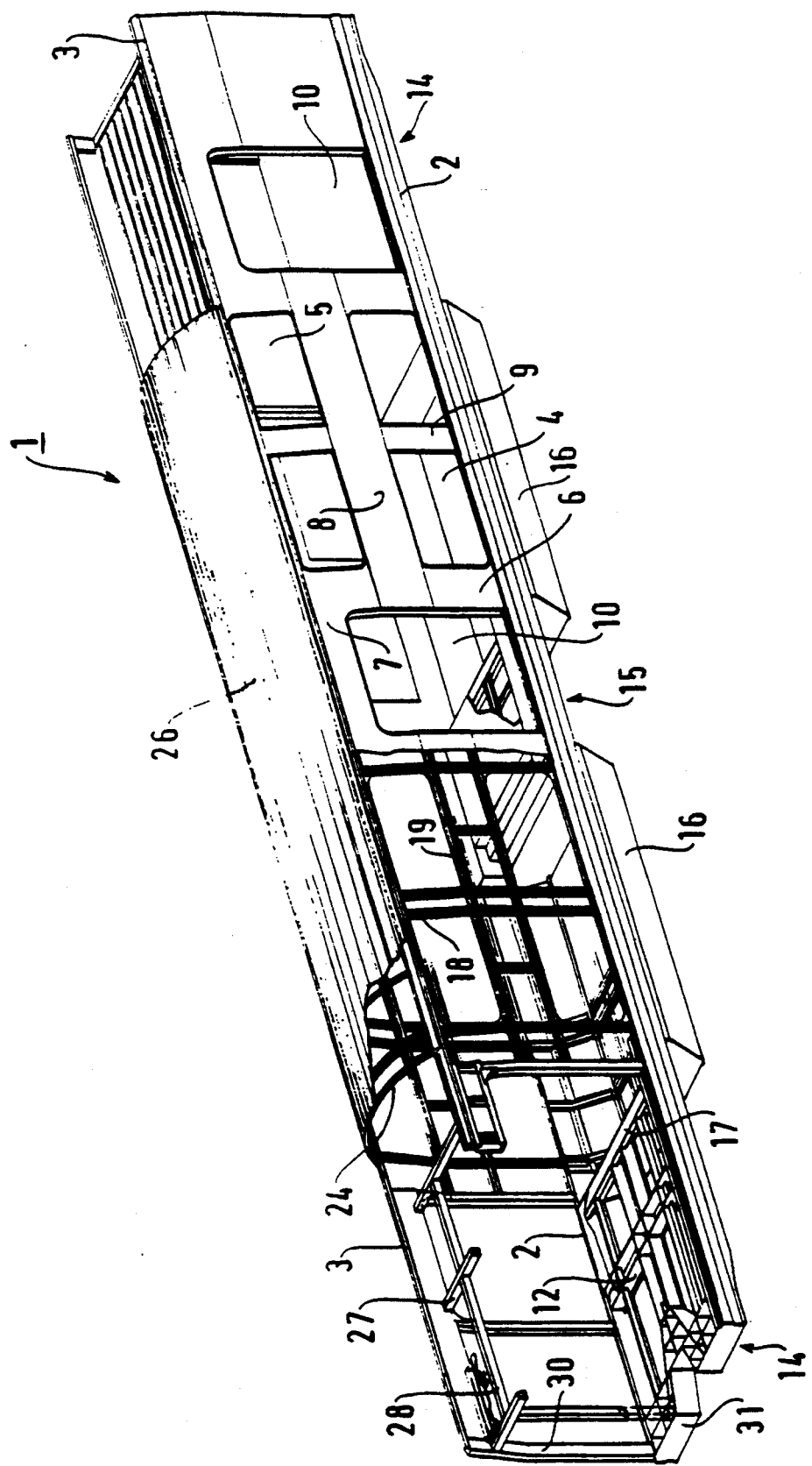
FIG. 1 shows a double-decker rail vehicle body in accordance with the invention.

FIG. 1 shows the body 1 of a double-decker rail vehicle. It is a perspective view having the covering partially taken away to show the structure of the vehicle. The body is constituted by a structure made up of thick section members (3 mm to 5 mm thick) that are assembled together by metal inert gas (MIG) welding to provide the strength of the structure. The metal sheets covering its faces are secured to the structure by resistance spot welding that uses little energy and therefore gives rise to little deformation, or by tungsten inert gas (TIG) spot welding in zones that are difficult to access. Discontinuous MIG fillet welds and continuous welds where leak-proofing is required serve to provide strong connections.

Sheet metal area has been reduced in order to leave the strength-providing structures visible. Length members 2 and roof battens 3 can be seen. The window area has been increased by eliminating metal sheets between the bottom windows 4 and length members 2, and between the top windows 5 and the roof battens 3. This disposition makes it possible to save mass and avoids as much as possible the use of continuous leak-proofing welds which give rise to large amounts of deformation at the edges of the sheets.

The side faces of the vehicle comprise plane sheets such as those referenced 6, 7, 8, and 9. Between access doors 10, the sheet area is kept small between the top and bottom windows 5 and 4, and level with the window piers. The sheets are secured by resistance spot welds and by discontinuous MIG fillet welds to the structure made of thick folded or formed section members assembled by MIG welding.

Each length member 2 is advantageously made as a single piece extending along the entire length of the body, thereby providing good strength for withstanding forces. The chassis is made up of section members: sole bars 11; cross bars 12; and longitudinal girders 13 (see FIGS. 1 and 2), which are assembled together by MIG welding.

In order to optimize manufacture and obtain subassemblies that are homogeneous prior to final assembly, the chassis of the vehicle described herein by way of example is made up of seven modules. The two ends 14 of the chassis may be made of high elastic limit steel. The central platform 15, the troughs 16, and the two length members 2 are made of stainless steel.

Final assembly of the chassis is performed by means of transversely extending angle bars 17. Angle bars 17 are situated between the end sheet of the trough 16 and the cross member of the chassis end 14 and facilitate adjusting the chassis longitudinally and vertically. The assembly constituted by the ends 14, the central platform 15, and the two troughs 16 is then framed by the length members 2 which, being continuous along the entire length of the vehicle, serve to provide better stiffness in compression and in vertical loading. Assembly is performed by gusset plates and by link plates.

The framework of the side faces is made up of omega-section cross-members 19 and uprights 18 which are assembled together by MIG welding. The uprights 18 and the cross-members 19 are fixed to the length members 2 and to the roof battens 3, also by MIG welding.

As illustrated in FIG. 1, each length member 2 is constituted by a formed section member of 4 mm thickness. Along the troughs 16, length member 2 is brought into contact with the transverse wide flat plate which extend up from the troughs 16 to the top of the length member 2 to meet the side face uprights 18. This provides continuity between the chassis cross-members, the uprights of the side faces, and the roof arches.

The doors are defined by uprights 21 welded to the length members and secured to the roof battens 3 by means of section members 22. The corners between the uprights 21 and the section members 22 are rounded by corner elements 23 which are welded using MIG welding and which reinforce the framework of the side faces.

The framework of the roof is constituted by arcuate section members 24 assembled to the roof battens 3 by MIG welding.

The roof metal sheets 26 are constituted, for example, by seven strips of corrugated metal sheet that are welded together by strong seam welding and that are welded to the roof framework by double spot welds, with the roof sheeting being considered as non-load-bearing.

At the ends of the vehicle, the disengaged roofing is implemented by a plane framework constituted by transverse section members 27 and longitudinal section members 28 that are tubular in shape.

The ends of the body, as reinforced by anticollision tubular uprights 30, bear against the end cross-members 31 and against the roof battens 3.

The connection between the visible structure and the sheets of the side faces is optimized by setting back the structure of the face relative to the length member and to the roof batten both of which remain visible. This setback may be of the order of 15 mm. It makes it possible to limit the extent to which the longitudinal welds are visible by virtue of the change of plane. This setback advantageously makes it possible to weld the upright 18 outside the radius of curvature 35 of the length member and to avoid special machining of the uprights (see FIG. 3).

Figure 2:
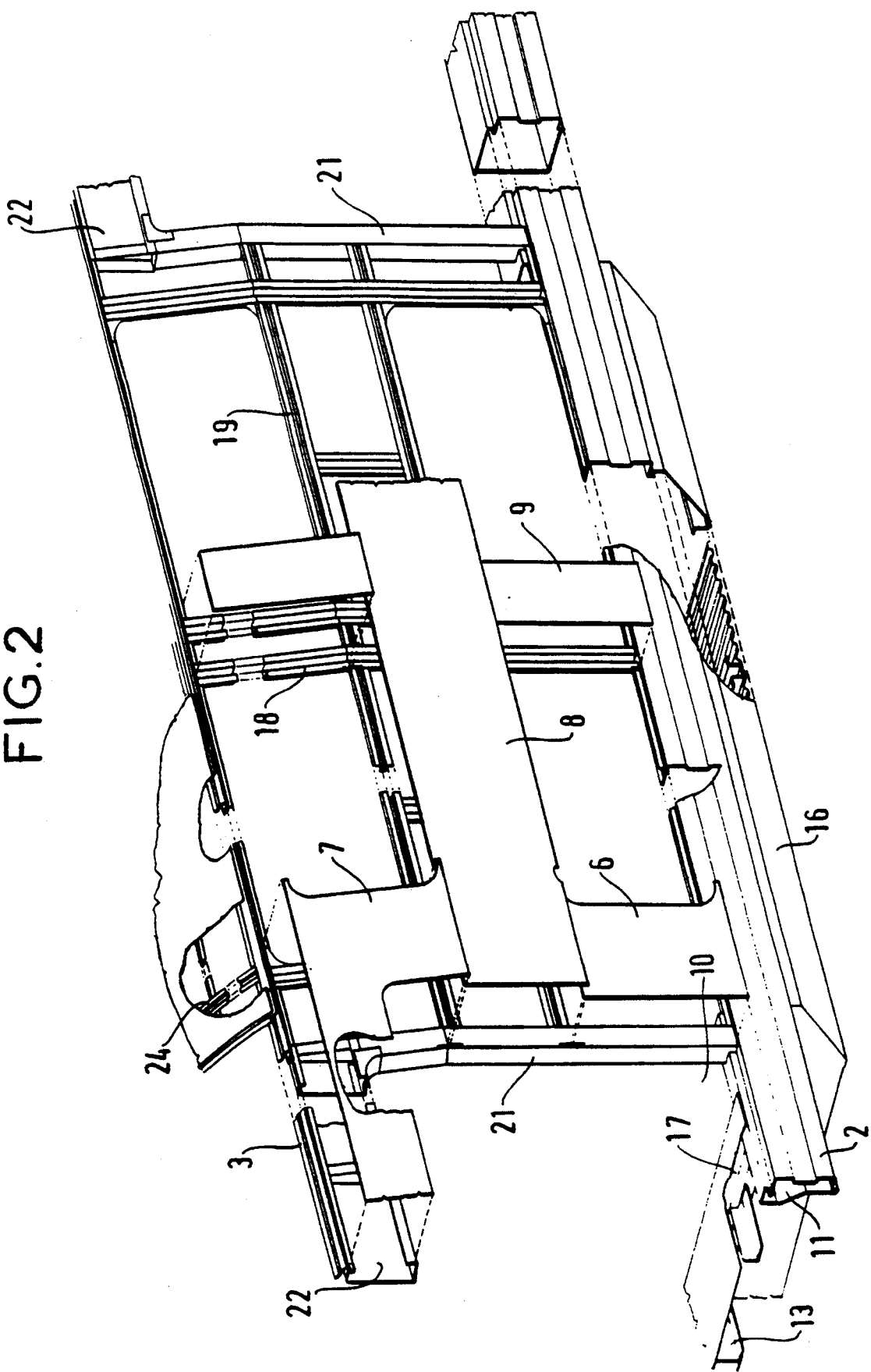
FIG. 2 is a fragmentary view of the FIG. 1 body showing how sheets are fixed onto a side face.
Figure 3:
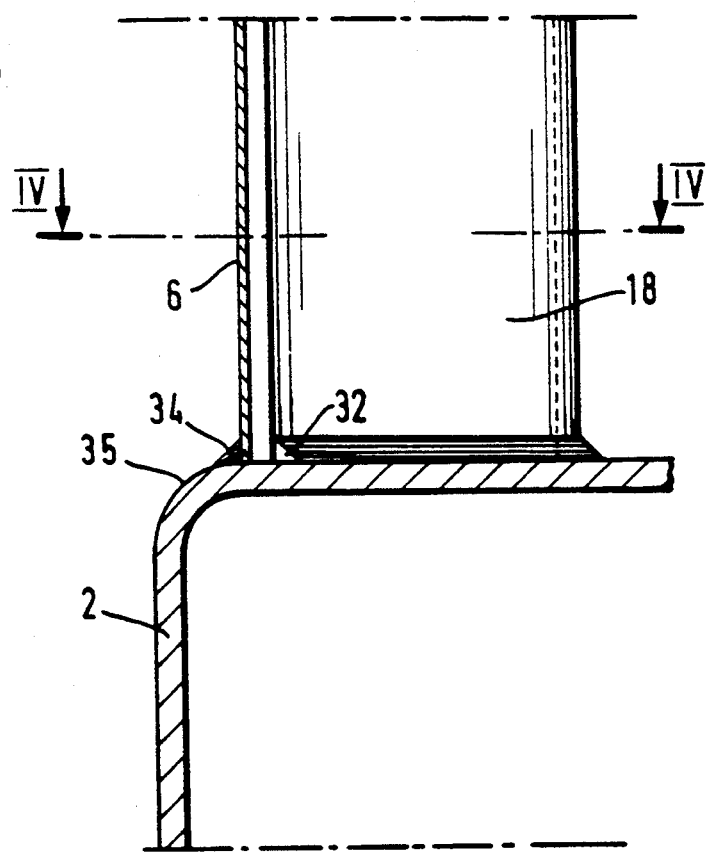
FIG. 3 is a detail view of the strength-providing structure of the rail vehicle body of the invention.
Figure 4:
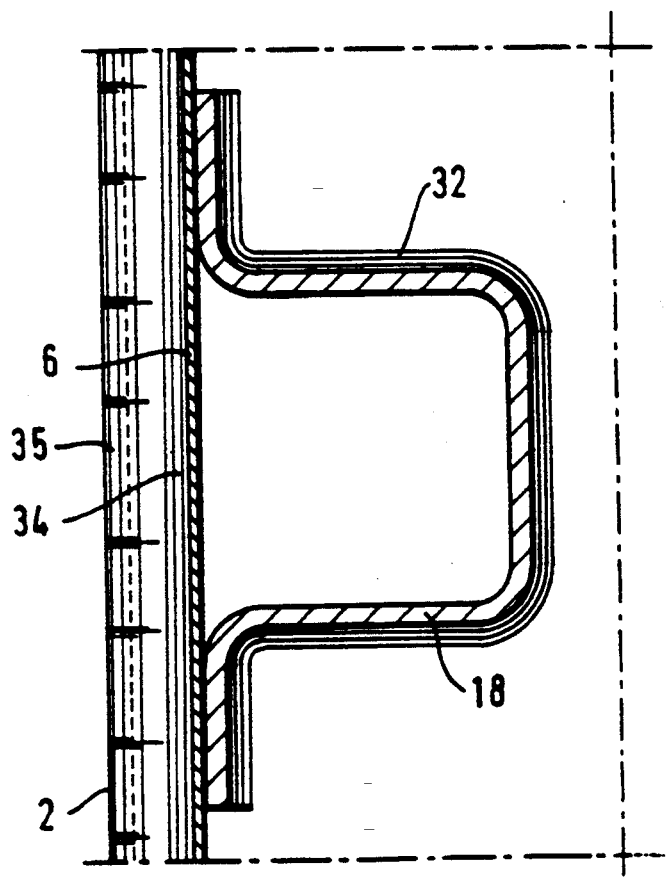
FIG. 4 is a section view on IV—IV of FIG. 3.

FIGS. 3 and 4 show how a side face is set back relative to its length member. The member 2 is shown in cross-section in FIG. 3. The uprights 18 are welded in a setback position onto the member 2 by MIG type welds 32 situated on the inside of the vehicle. A metal sheet, e.g. the sheet referenced 6 in FIGS. 1 and 2, is welded to the length member 2 by means of continuous MIG welding 34 which is set back relative to the length member.

Figure 5:
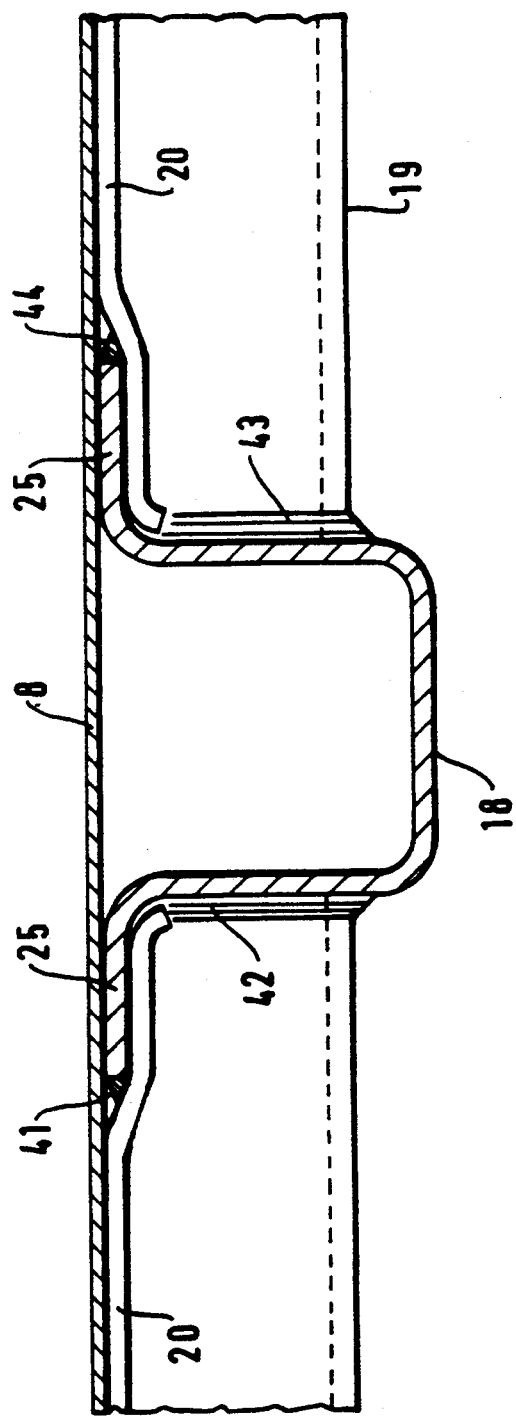
FIG. 5 shows an assembly node where the section members of the side face are assembled together.

The vertical section members 18 and the horizontal section members 19 constitute the side face framework as shown in FIGS. 1 and 2. FIG. 5 shows a plan view (as seen from above) of an intersection of section members 18 and 19. Horizontal section member 19 is discontinuous at the intersection. Section members 18 and 19 are stamped and cut out so as to present a plain surface on which the plain metal sheets are placed. FIG. 5 illustrates this construction with flange 20 of member 19 and flange 25 of member 18 presenting a plain surface to plain metal sheet 8. This procedure also makes it possible to limit the milling of the welds adjacent to the sheet metal and to eliminate machining for fitting the section members together. By using section members of different depths, it is possible for welding at the assembly points to be offset from the radius, thereby limiting the deformation and the notches in the fold radii for fitting the pieces together.

The member 19 is not as deep as the member 18. There is a gap in the member 19 at the assembly node. Its flanges 20 are stamped at this point and placed behind the flanges 25.

MIG welds 41, 42, 43, and 44 connect the two section members together, said welds taking place outside the radius. This method of placing the section members provides a plane surface for receiving the metal sheet 8 which can be fixed both to the section member 18 and to the section member 19.

Figure 6:
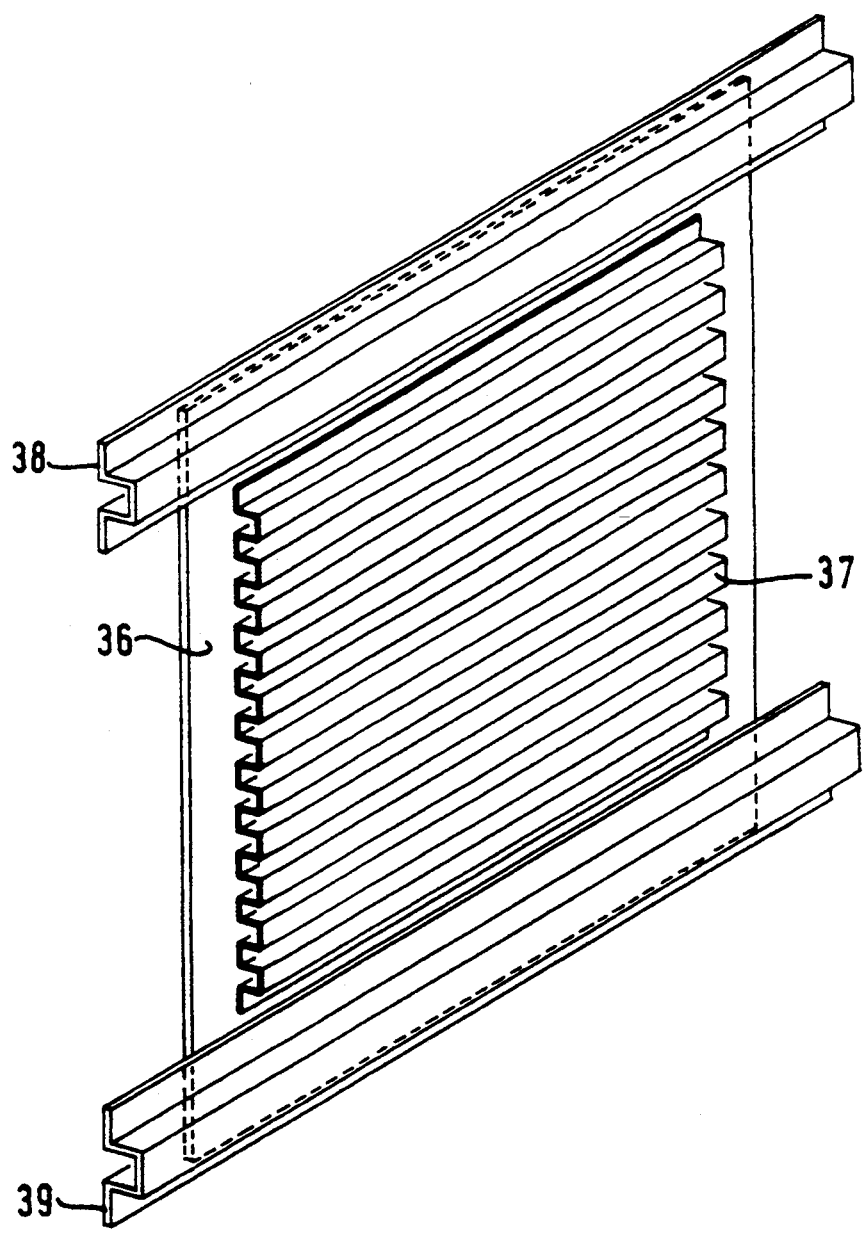
FIG. 6 shows an element of sheet metal reinforced by means of a corrugated sheet.

In order to limit deformation of the metal sheets between the structural section members and to obtain side and end subassemblies made of sheet metal, it is possible to reinforce the sheet metal elements by means of a corrugated sheet that serves to stiffen them. Such a corrugated sheet made of stainless steel can be fixed to the sheet metal by two-spot resistance welds that blemish the visible surface little. FIG. 6 shows an element of sheet metal 36 that is reinforced on its face on the inside of the vehicle by a corrugated sheet 37. Two section members 38 and 39 of the strength-providing structure of the body can also be seen with the sheet metal elements 36 being fixed thereto. The reinforcement makes it possible to eliminate the operation of the sheet metal overlying the bays in the body being put under tension. At the end of the body where tensioning of the sheet metal is impossible, it is essential to use reinforced metal sheet.

Figure 7:
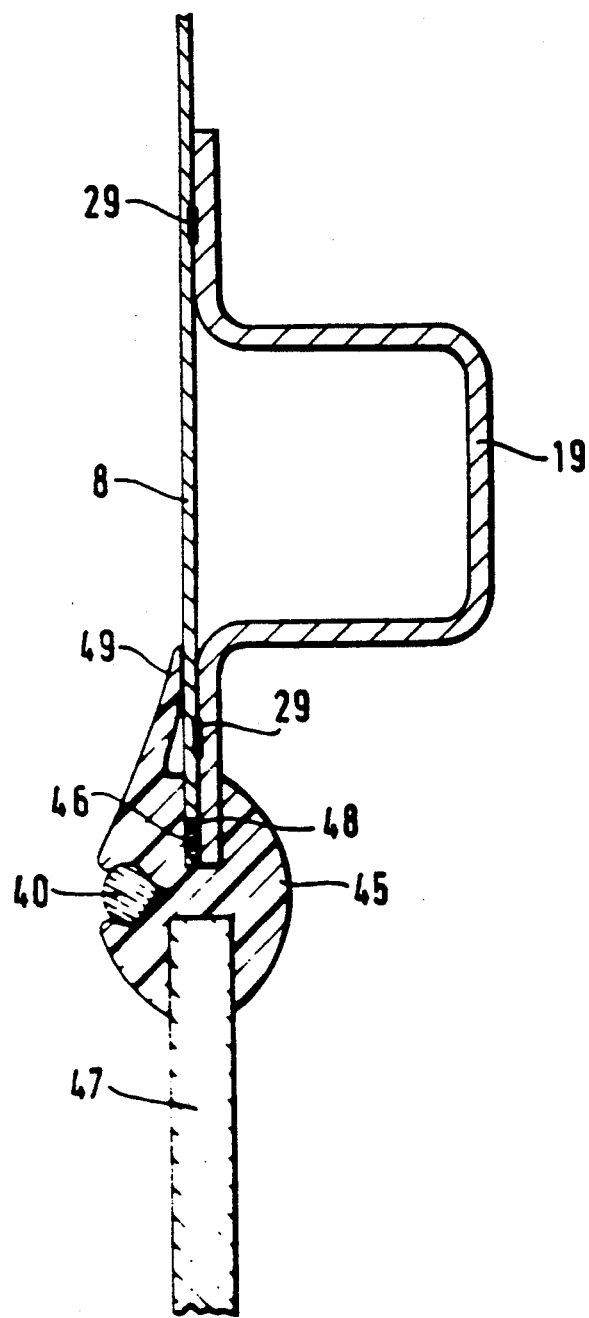
FIG. 7 shows a detail of how a window bay is assembled.

Sealing is provided around the window bays by window gaskets as shown in FIG. 7 where there can be seen a side face cross-member 17 on which the edge of a metal sheet 8 is welded by spot welds 29. Discontinuous MIG fillet welding 48 is performed between the edge of the metal sheet 8 and the cross-member 19. The glass 47 of the window bay is held to the framework of the side face and in particular to the cross-member 19 by a window gasket 45. Before the gasket is installed, a fillet 46 of sealant is deposited on the cross-member 19 at the edge of the sheet metal 8 in those places where there is no welding 48. The window gasket 45 has a lip 49 that bears against the sheet metal 8 and that serves to hide the resistance spot welding. A gasket key 40 inserted in the resilient gasket material 45 serves to ensure proper pressure between the gasket and the glass 47 and between the gasket and the cross-member 19 or the sheet metal 8.

The surface of the body may then be subjected to conventional surface treatment for the purposes of removing flux from the welds and of giving the metal sheet a uniform appearance.

We claim:

1. A rail vehicle body comprising:
 a chassis having stainless steel length members disposed longitudinally along either edge;
 side face frameworks comprising horizontal and vertical section members;
 stainless steel roof battens disposed longitudinally along either edge of the top of the body; and
 side face covering sheets comprising sheets of stainless steel that are smooth and thin relative to said section members, the sheets being fixed by continuous leak-proof welding to edges of the length members and the roof battens so that the area of said metal sheets is as small as possible;
 wherein said length members said roof battens are continuous along the entire length of the body, and constitute part of the visible external surface of the body; and
 wherein the side face covering sheets are set back relative to the chassis length members and the roof battens.

2. A body according to claim 1, wherein upper window bays extend up to the roof battens, and lower window bays extend down to the length members.

3. A body according to claim 1, wherein there is no covering sheet metal between window bays and the length members or between the window bays and the roof battens.

4. A body according to claim 1, wherein the body is a body of a double-decker rail vehicle, and there is no covering metal sheet between bottom window bays and the length members or between top window bays and the roof battens.

5. A body according to claim 1, wherein said horizontal and vertical section members form intersections, said horizontal and vertical section members being stamped and cut out at said intersections so as to form a common plane surface.

6. A body according to claim 1, wherein the chassis is also made up of section members.

7. A body according to claim 1, wherein the length members, the roof battens, the side face frameworks, and the chassis are assembled together by weld fillets that include filler metal.

8. A body according to claim 1, wherein the side face covering sheets are secured as follows: by TIG spot welds in zones that are difficult to access; by discontinuous fillet welds with filler metal around window bays and door bays; by continuous leak-proofing welds between side face covering sheets and the length members, and between side face covering sheets and roof battens; and by resistance spot welds otherwise.

9. A body according to claim 1, wherein the side face cover sheets are fixed to corrugated sheet members for stiffening purposes.

10. A body according to claim 1, wherein the chassis is made of a plurality of lengths extending from one of the ends of the body to the other end.

11. A body according to claim 10, wherein the end lengths of the chassis are made of high elastic limit steel.

12. A body according to claim 10, wherein the chassis lengths are secured to one another by transverse section members of the chassis.

13. A body according to claim 12, wherein the chassis-securing section members are bar members.

* * * * *